(12) United States Patent  
Yokota

(10) Patent No.: US 6,473,152 B1  
(45) Date of Patent: Oct. 29, 2002

(54) IMAGE PRINTING APPARATUS AND TABLE THEREFOR

(75) Inventor: Masahiko Yokota, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/549,933

(22) Filed: Apr. 14, 2000

(30) Foreign Application Priority Data

Apr. 23, 1999 (JP) ............................................. 11-116894

(51) Int. Cl.⁷ ........................ G03B 27/52; G03B 27/32; G03G 21/70; B41J 29/13; G01D 15/00
(52) U.S. Cl. ............................ 355/30; 355/39; 399/92; 399/94; 399/107; 347/108; 347/138; 347/152; 346/145
(58) Field of Search ............................ 399/92, 94, 107; 347/108, 138, 152; 346/145; 355/30, 39

(56) References Cited

U.S. PATENT DOCUMENTS

| | | | |
|---|---|---|---|
| 4,356,702 A | * | 11/1982 | Kuttel ............................ 62/62 |
| 4,676,682 A | * | 6/1987 | Schacht |
| 5,054,210 A | * | 10/1991 | Schumacher et al. ........... 34/78 |
| 5,881,567 A | * | 3/1999 | Junge et al. ................... 62/428 |
| 6,009,748 A | * | 1/2000 | Hildebrandt ................. 219/523 |
| 6,134,747 A | * | 10/2000 | Leibman |

FOREIGN PATENT DOCUMENTS

JP   7-14764   3/1995

* cited by examiner

Primary Examiner—Russell Adams  
Assistant Examiner—Khaled Brown  
(74) Attorney, Agent, or Firm—Fitzpatrick, Cella, Harper & Scinto

(57) ABSTRACT

An image printing apparatus is provided with a plurality of support legs having height-adjusting screws for providing a substantially horizontal support on an inclined installation surface, whereby a flow path is formed to exchanged atmosphere and heat through a gap formed between a lower surface portion and an installation surface.

13 Claims, 11 Drawing Sheets

F I G. 5
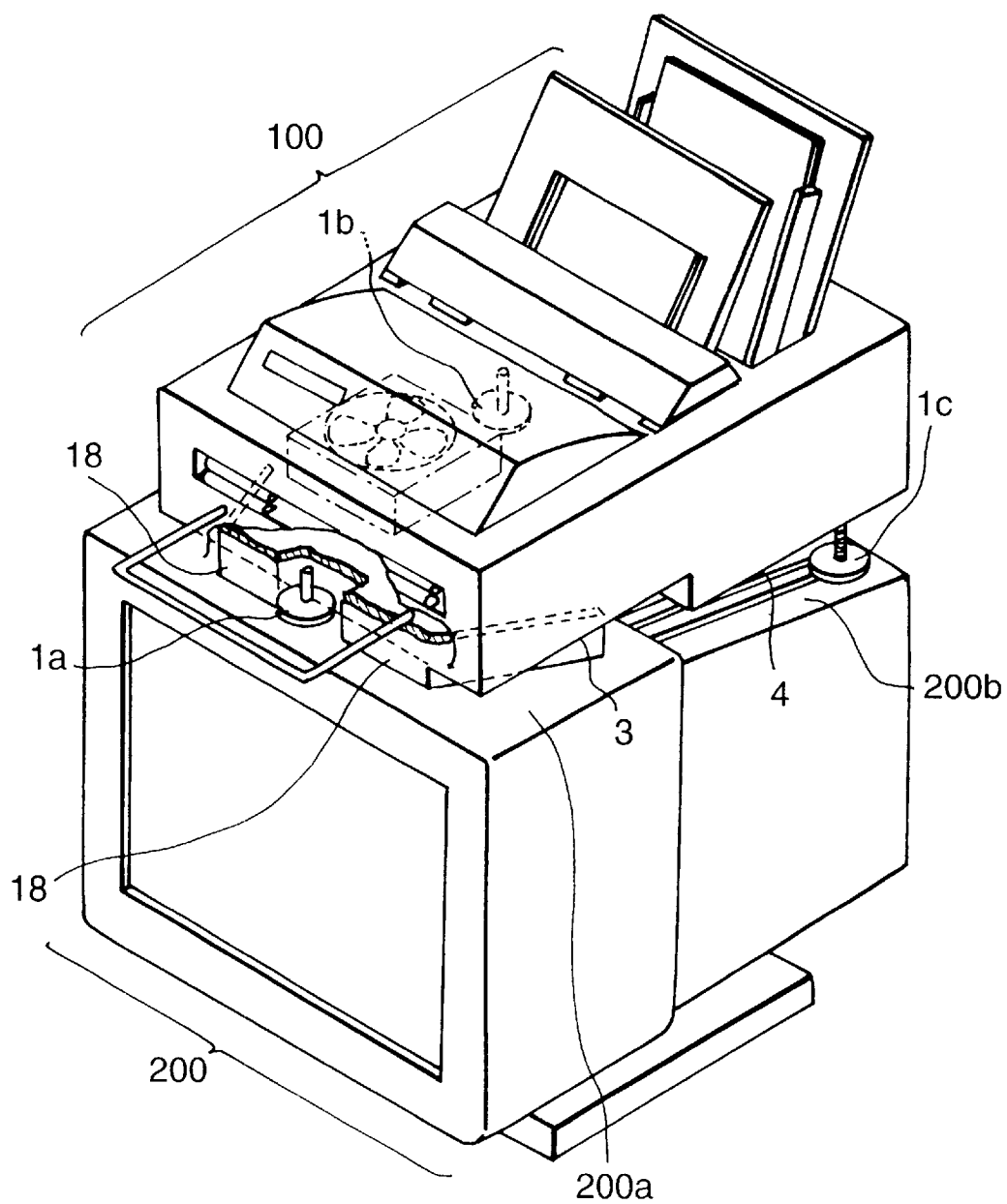

IMAGE PRINTING APPARATUS AND TABLE THEREFOR

FIELD OF THE INVENTION

The present invention relates to an image printing apparatus and a table therefor, and concerns a technique with which an image printing apparatus, e.g., a copying machine, an electrophotographic printer, an ink-jet printer, or a facsimile apparatus, incorporating an image printing means serving as a heat source is used as it is set on a display unit.

BACKGROUND OF THE INVENTION

An apparatus, e.g., an electrophotographic printer, an inkjet printer, or a facsimile apparatus, which is provided with a desktop type image printing means has a housing designed to have a flat bottom surface in order to stabilize the apparatus, on the premise that the apparatus, when used, is set on a flat desk.

Japanese Utility Model Laid-Open No. 7-14764 proposes to add a height-adjustable leg to a carrier plate, and to place this plate on a television receiver having an inclined upper surface, thereby providing a flat surface. An article can be placed on the flat surface by adjusting the height of the leg. As a result, the space above the television receiver can be effectively used to place a doll, a flower vase, and the like.

SUMMARY OF THE INVENTION

A conventional image printing apparatus is often set, together with a personal computer, on a desk used daily by the user. This decreases the work area of the user. In the table for the television receiver according to Japanese Utility Model Laid-Open No. 7-14764 described above, heat radiated from the rear portion for the television receiver tends to be trapped in the space between the television receiver and the table. If this television receiver table is directly used to place a computer display monitor which is usually operated for a long period of time, heat damages the display and causes trouble easily, leading to a short service life of the apparatus.

The present invention has been made in view of the problem described above, and has as its object to provide an image printing apparatus and a table therefor, which can make a flat installation surface unnecessary and which are not influenced by external and internal heat sources.

Additionally, it is another object of the present invention to provide an image printing apparatus and a table therefor, which do not make the user feel uncomfortable during use.

In order to solve the above problem and to achieve the above objects, according to the present invention, there is provided an image printing apparatus comprising a plurality of support means having height adjusting portions for providing a substantially horizontal support on a installation surface, characterized in that a flow path is formed to exchange atmosphere and apparatus-generated heat through a gap formed between a lower surface portion of the image printing apparatus and the installation surface.

There is also provided an image printing apparatus comprising front and rear support means having a height adjusting function for providing a substantially horizontal support on an installation surface of a display unit having different-height steps in a back-and-front direction, characterized in that a flow path is formed to exchange atmosphere and apparatus-generated heat through a gap formed between a lower surface portion of the image printing apparatus and the installation surface.

There is also provided a table for an image printing apparatus, which is set substantially horizontally on an installation surface including a display unit having steps with different heights in a back-and-front direction; the table comprises a base portion comprising front and rear support means having height adjusting portions and formed with a flow path to exchange atmosphere and apparatus-generated heat through a gap formed between a lower surface portion and the installation surface, and a ventilation regulating member for regulating a flow of gas between a front edge of the lower surface portion and the installation surface.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 5 is an outer appearance perspective view showing a state wherein the multi-function apparatus of FIG. 1 is set on a display monitor;

DETAILED DESCRIPTION OF THE PREFERRED EMBODIMENTS

The preferred embodiments of the present invention will be described with reference to the accompanying drawings.

Figure 1:
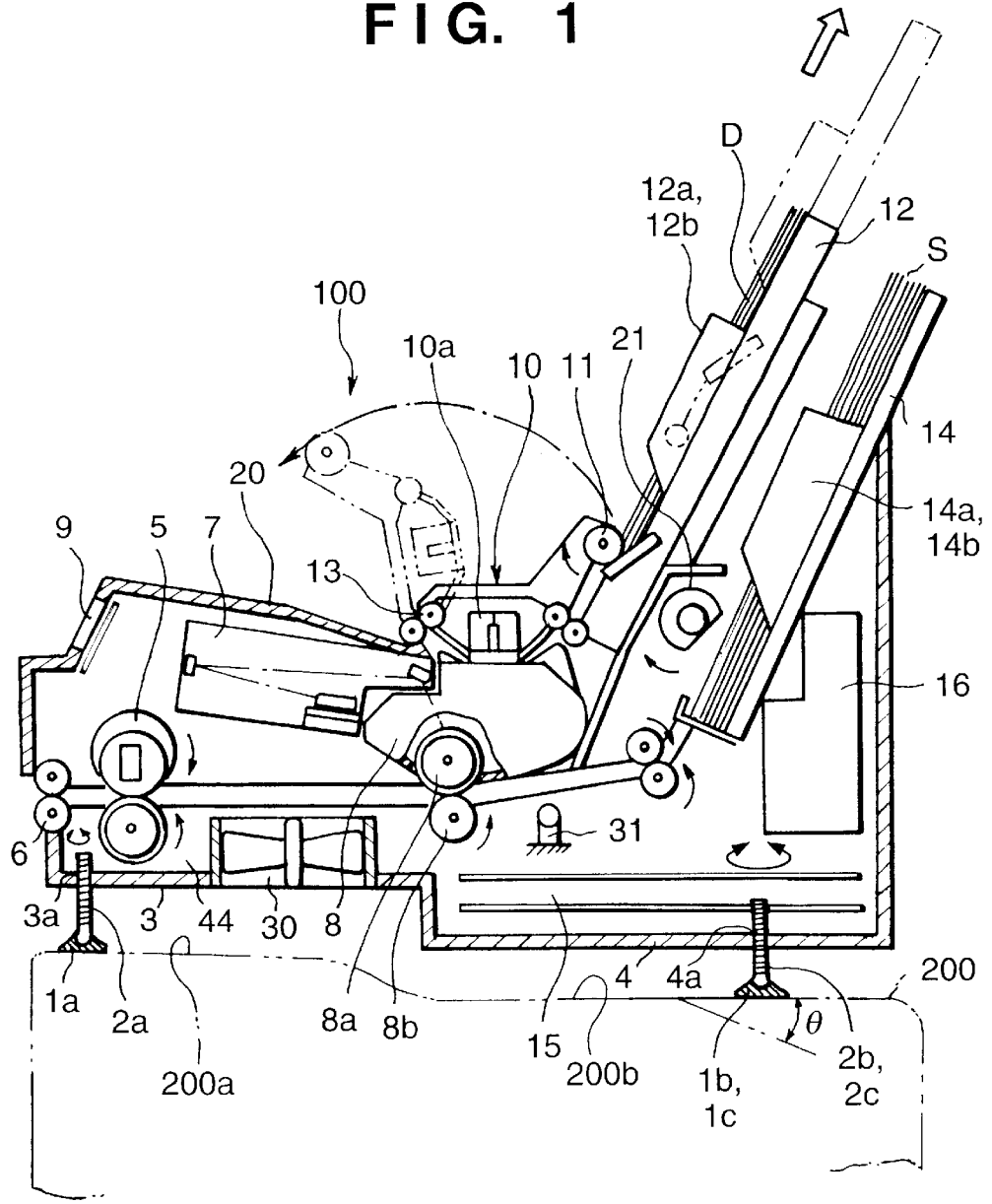
FIG. 1 is a sectional view of a multi-function apparatus according to the first embodiment.
Figure 2:
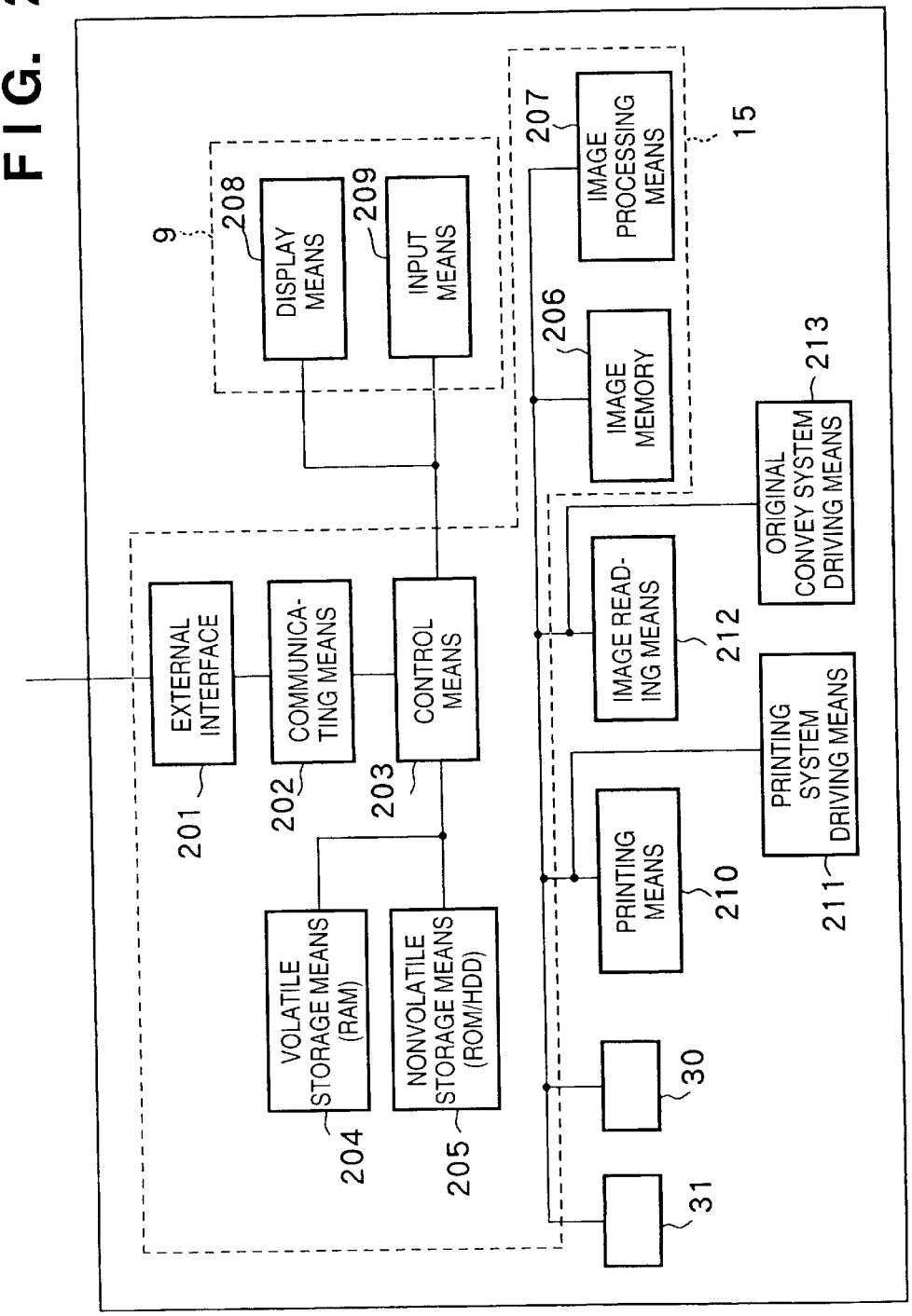
FIG. 2 is a block diagram of the control system of the multi-function apparatus of FIG. 1.

FIG. 1 is a sectional view showing the schematic arrangement of a multi-function apparatus 100 on which an image printing means is mounted. FIG. 2 is a block diagram of the apparatus 100 of FIG. 1.

Referring to FIGS. 1 and 2, the multi-function apparatus 100 is roughly comprised of a control means 203, image printing means 210, image reading means 212, communication means 202, an external interface 201, display means 208, and input means 209. A volatile storage means (RAM) 204, nonvolatile storage means (ROM board/HDD unit) 205, and image memory 206 are connected to the control means 203 through bus lines, as shown in FIG. 2. The communicating means 202 is capable of communication with a stand-alone computer connected to it, communication via an analog telephone line, a digital telephone line, or a LAN, and infrared-ray communication or radiocommunication.

The control means 203 is connected to the driver of a blower fan 30 (to be described later) and a temperature sensor 31. The temperature sensor 31 is arranged near the image printing means 210 and detects temperature and sends detection temperature information to the control means 203.

The above respective means form an electronic circuit mounted on a board 15 indicated by a broken line in FIG. 2, and can be assembled together with connectors (not shown).

Referring to FIG. 1, the overall arrangement of the main body will be described. The lower surface portion of the apparatus 100 forms front and rear steps 3 and 4 as shown in FIG. 1, which substantially correspond to front and rear carrier surfaces 200a and 200b of a display 200 indicated by an alternate long and a short dashed line in FIG. 1.

Screw holes 3a and 4a are formed in the steps 3 and 4 at positions shown in FIG. 1. When screw threads 2a to 2c formed on the circumferential surfaces of support legs 1a to 1c serving as support means are rotated with respect to the apparatus 100 in directions indicated by arrows, they fix the apparatus 100 while forming a height adjusting portion. The support legs are provided one at the center on the front side of the lower surface of the main body apparatus, and two at the rear portion as will be described later, to support the entire structure at three points. The support legs have countersunk members axially, displaceably supported by ball bearings (shown in FIG. 2) to support the apparatus 100 on the carrier surface 200b inclined at an angle θ.

The heat dissipation fan 30 is provided on the lower surface portion of the main body at the position shown in FIG. 1, to radiate and discharge heat from and around a fixing unit 5 in the main body apparatus and from and around a process cartridge 8 to outside the main body. The process cartridge 8 is comprised of a photosensitive drum 8a as well as cleaning means, charging means, and toner (not shown). A power supply, communicating means 16 for exchanging data with an external network, and the circuit board 15 on which the respective means described above are mounted, are fixed at a positions shown in FIG. 1.

An image reader 10 is provided on the process cartridge 8. The image reader 10 photoelectrically converts an image on a conveyed original D with a contact-type image sensor 10a incorporating an LED light source and reads it as binary data. This data is sent to the circuit board 15 and is subjected to a predetermined image process. An operation unit 9 is made up of input keys comprised of tact switches, and a display means comprising an LCD, and is disposed on the obliquely upper portion of the front surface so that it is easy for the user to operate.

The reader 10 is comprised of an original table 12 on which originals D are stacked, original width regulating plates 12a and 12b that are adjustable in the widthwise direction to align two sides of the original and to prevent a ramp or skew of the original, a separator 11 that extracts the originals D one by one and conveys the separated original D downstream, and the contact type image sensor 10a. The image reader 10 can be opened/closed from a position indicated by a solid line to a position indicated by an alternate long and two short dashed line in FIG. 1 about the rotating shaft of one delivery roller 13 as the pivot center. After the image reader 10 pivots to the position indicated by the broken line in a direction indicated by the arrow of an alternate lone and short dashed line, an original jam process can be performed. The original D, the image of which has been read, is delivered to a delivery unit 20 on the upper surface of the main body.

Since the image reader 10 can be opened/closed in this manner, the process cartridge 8 can be exchanged.

Figure 4:
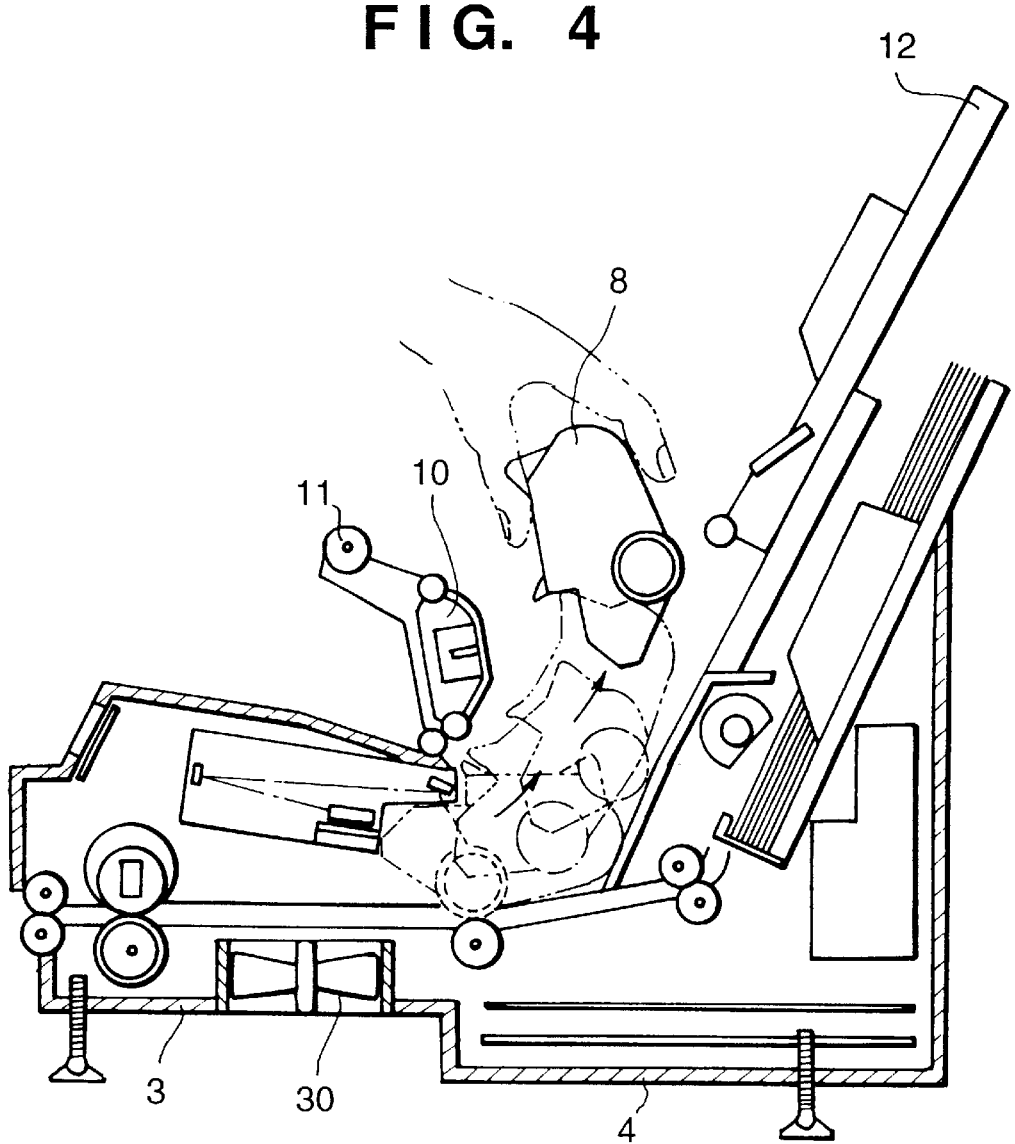
FIG. 4 is a view for explaining how to extract a process cartridge of FIG. 1.

Referring to FIG. 4 explaining the operation, when the image reader 10 is opened to the position indicated by a solid line, and the process cartridge 8 is moved in the direction of arrows, the process cartridge 8 can be extracted to the outside of the apparatus 100. Also, a new process cartridge can be set. At this time, the original table 12 has been moved upward.

The printing unit is comprised of a print sheet stacking tray 14 on which print sheets S are stacked, width-adjustable regulating plates 14a and 14b that regulate two sides of the print sheet S to prevent a ramp or skew of the print sheets S, a pickup roller 21 for picking up the print sheets S one by one, the photosensitive drum 8a in the process cartridge 8, on which a predetermined image to be transferred onto each of the print sheets S picked up one by one is to be formed, and a transfer roller 8b of a transfer unit.

Reference numeral 7 denotes a laser scanner unit constituted by a polygon mirror, a semiconductor laser unit, and a reflecting mirror. The laser scanner unit 7 converts an image signal read by the image reader 10 by means of image processing of a controller (circuit board) 15, and image information received from an external interface (communication means) 16, into a laser signal, and exposes the photosensitive drum 8a, which is cleaned and electrostatically charged, by irradiating it with a laser beam. When toner attaches to the photosensitized drum 8a (development) and is transferred to the print sheet S, the print sheet S is conveyed to the fixing unit 5 through a convey guide 44.

The toner is fixed to the print sheet S with a high temperature and a high pressure in the fixing unit 5. The print sheet S is then delivered to the outside of the main body through delivery rollers 6, and is placed on a tray 17.

Figure 3:
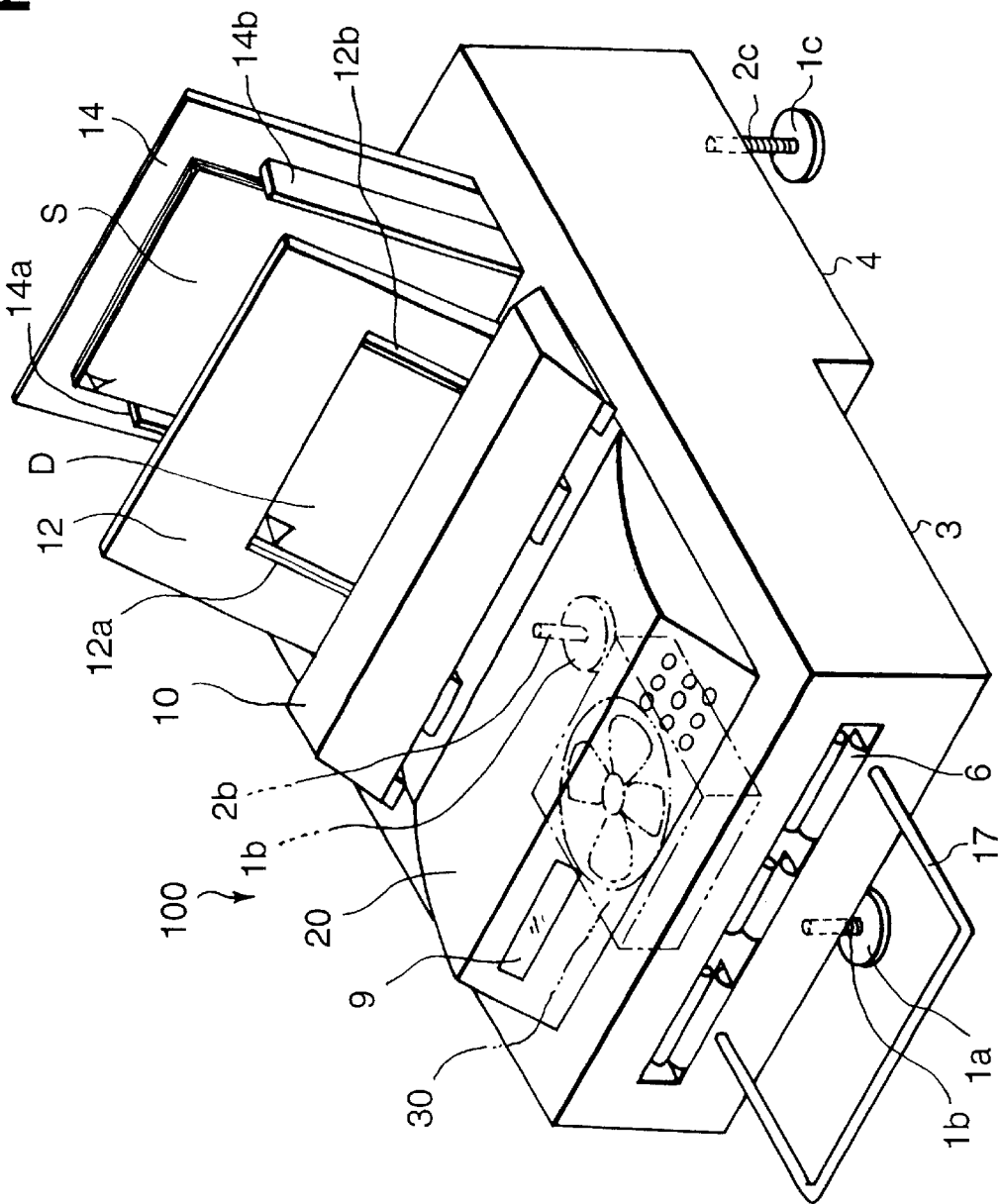
FIG. 3 is an outer appearance perspective view showing the multi-function apparatus of FIG. 1.

FIG. 3 is an outer appearance perspective view of the main body having the above arrangement. In FIG. 3, constituent components that have already been described are denoted by the same reference numerals, and a detailed description thereof will be omitted. The three support legs 1a to 1c provided to the lower portion of the apparatus 100 can be adjusted to different heights at the front and rear portions of the main body, and can float the main body from the installing place.

With the support legs 1a to 1c, the apparatus 100 can be installed even on the display monitor having steps on its installation surface, or at a-place where some object radiates heat from below.

The lowest positions of the height-adjusting female/male screws described above are regulated so that even if the screws are adjusted to the lowest positions, a ventilation gap can be formed under the apparatus 100.

In the outer appearance perspective view of FIG. 5 showing the installation state, an air duct guide 18 serving as a ventilation regulating member is also provided to close the front portion of the gap between the apparatus 100 and display monitor 200. This air duct guide 18 covers the front surface portion and two side portions of the lower surface of the front portion of the apparatus 100, as shown in FIG. 5.

If an elastically deformable material such as rubber or moltplain is used to form the guide 18, the guide 18 can reliably close (fill) the gap between the display monitor 200 and apparatus main body 100 regardless of the size of the gap. Alternatively, the guide 18 may be formed integrally with the support leg 1a, so that the guide 18 can be vertically extended/contracted.

Figure 6:
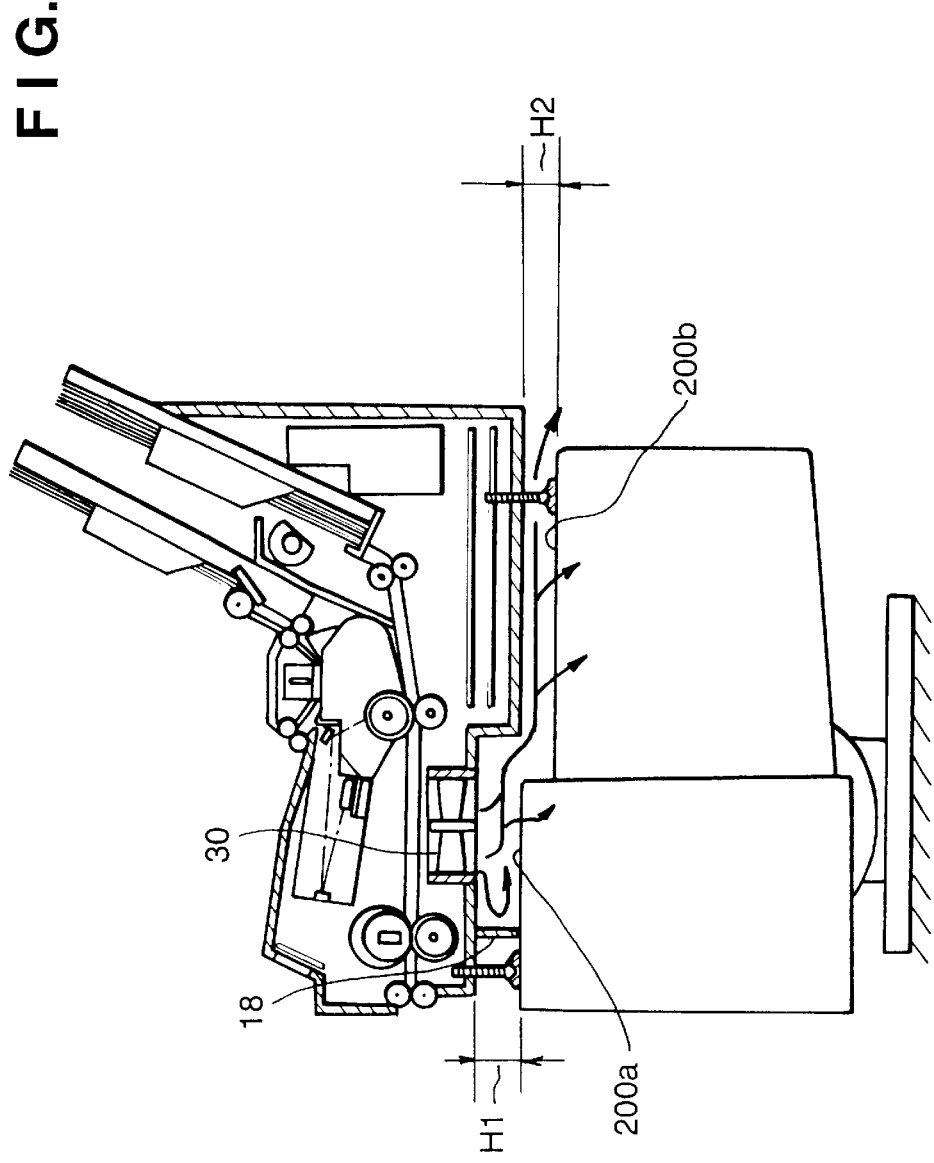
FIG. 6 is a sectional view of FIG. 5.

Referring to the sectional view of FIG. 6 showing the use state, the blower fan 30 for heat dissipation blows air to the upper surface of the display monitor 200 when dissipating heat in the apparatus 100. At this time, the air duct guide 18 forms an obstacle, so exhaust hot air does not directly hit the user who sits in front of the display monitor 200 to operate the apparatus 100. Since heat originating from the CRT high-pressure portion is also radiated from the rear carrier surface 200b of the display monitor 200, heat tends to accumulate in a gap H2 between the carrier surface 200b and apparatus 100. The blower fan 30 dissipates heat in the gap H2 as well.

When the arrangement described above is employed, the apparatus 100 can be set on the monitor 200, and the desktop can be used for different purposes. Even if the apparatus 100 is used for a long period of time, any adverse influence on the monitor 200 can be prevented.

Figure 7:
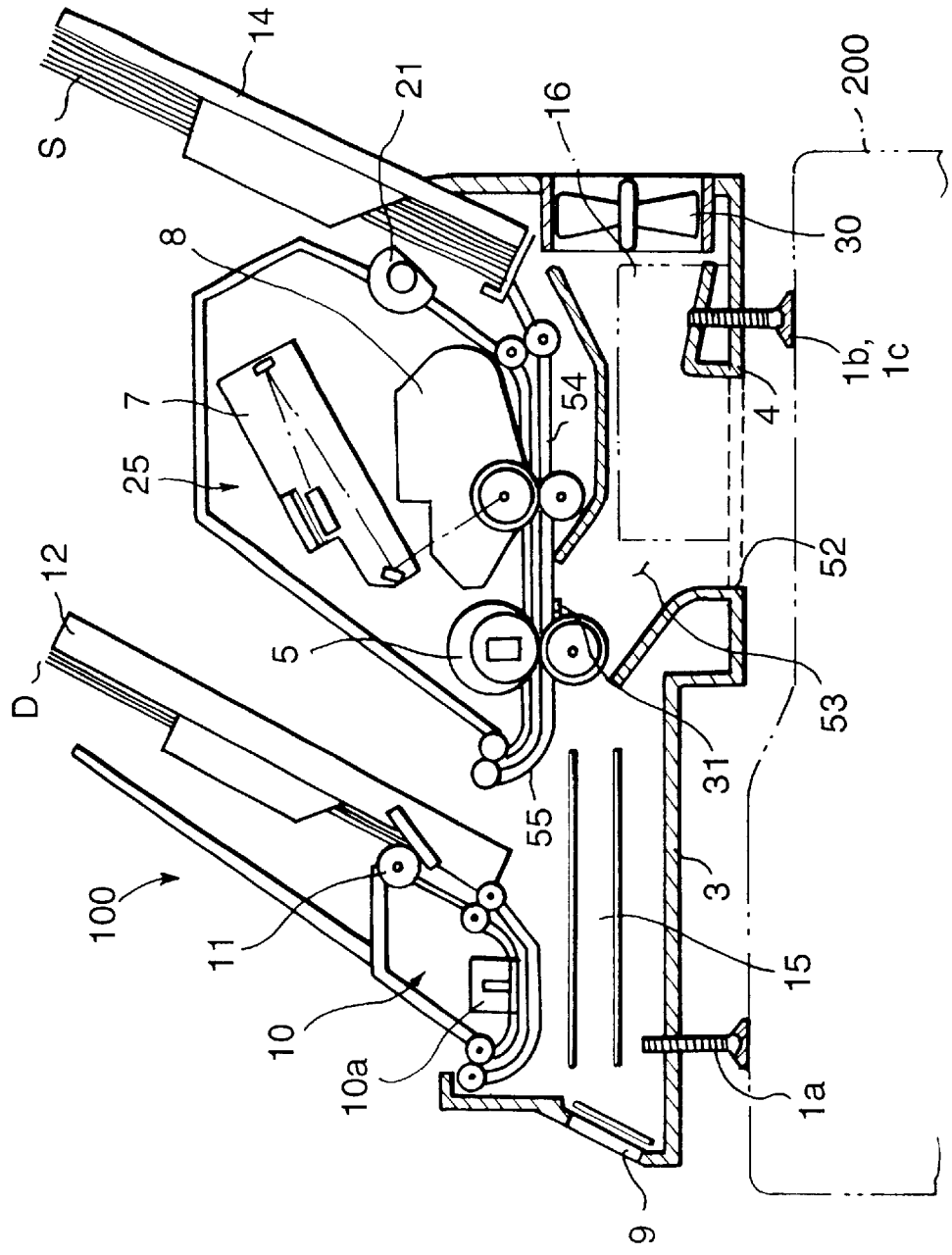
FIG. 7 is a sectional view of a multi-function apparatus according to the second embodiment.

FIG. 7 is a sectional view of the main part of another embodiment. Referring to FIG. 7, constituent components identical to those already explained are denoted by the same reference numerals as in the above embodiment, and a detailed description thereof will be omitted. A printing unit 25 is arranged behind an image reader 10, and a control circuit board 15 is arranged below the image reader 10. An air duct 53 serving as duct means is formed below the printing unit 25. The air duct 53 allows a ventilation opening 52 in the lower surface of the main body and a blower fan 30 behind the main body to communicate with each other.

Figure 8:
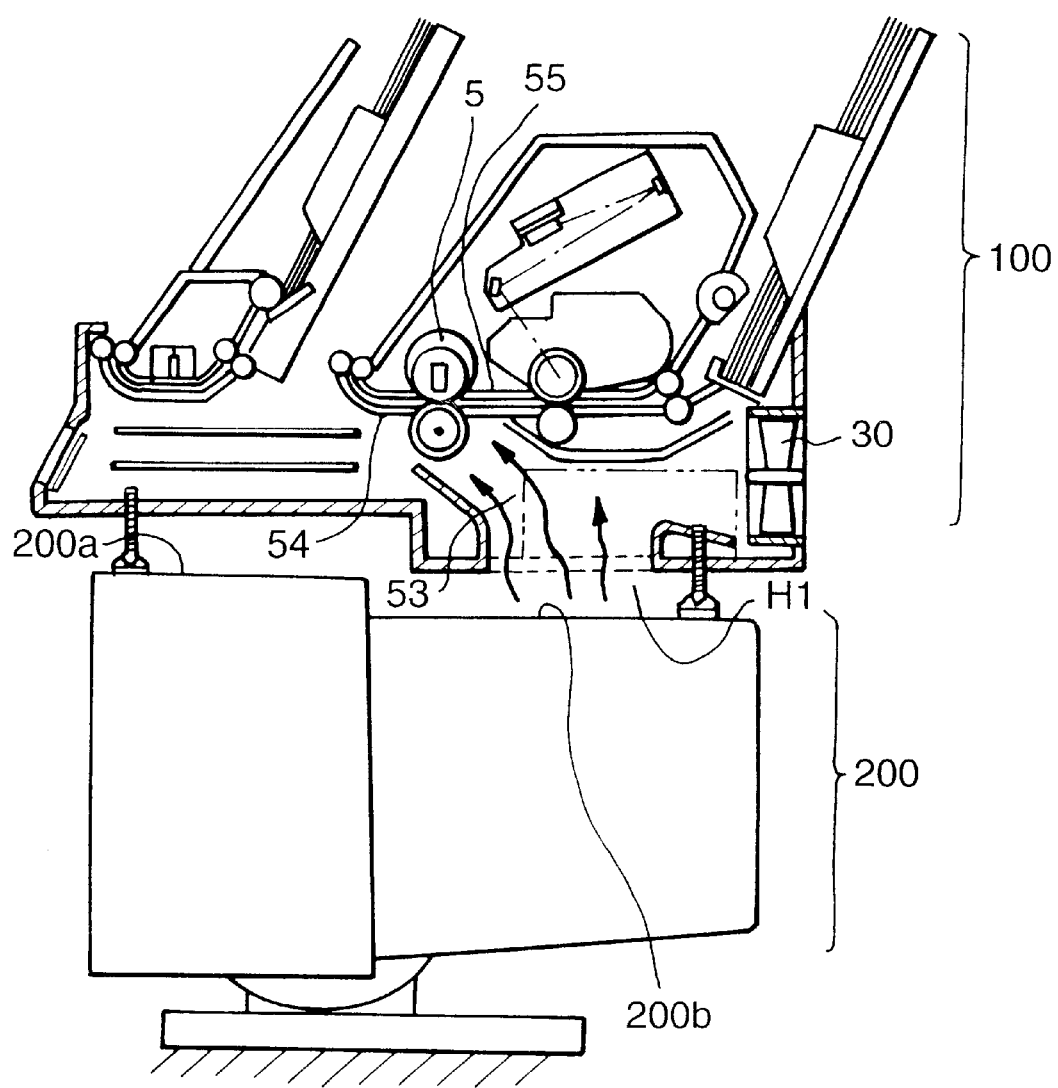
FIG. 8 is a sectional view showing a state wherein the multi-function apparatus of FIG. 7 is set on a display monitor.
Figure 9:
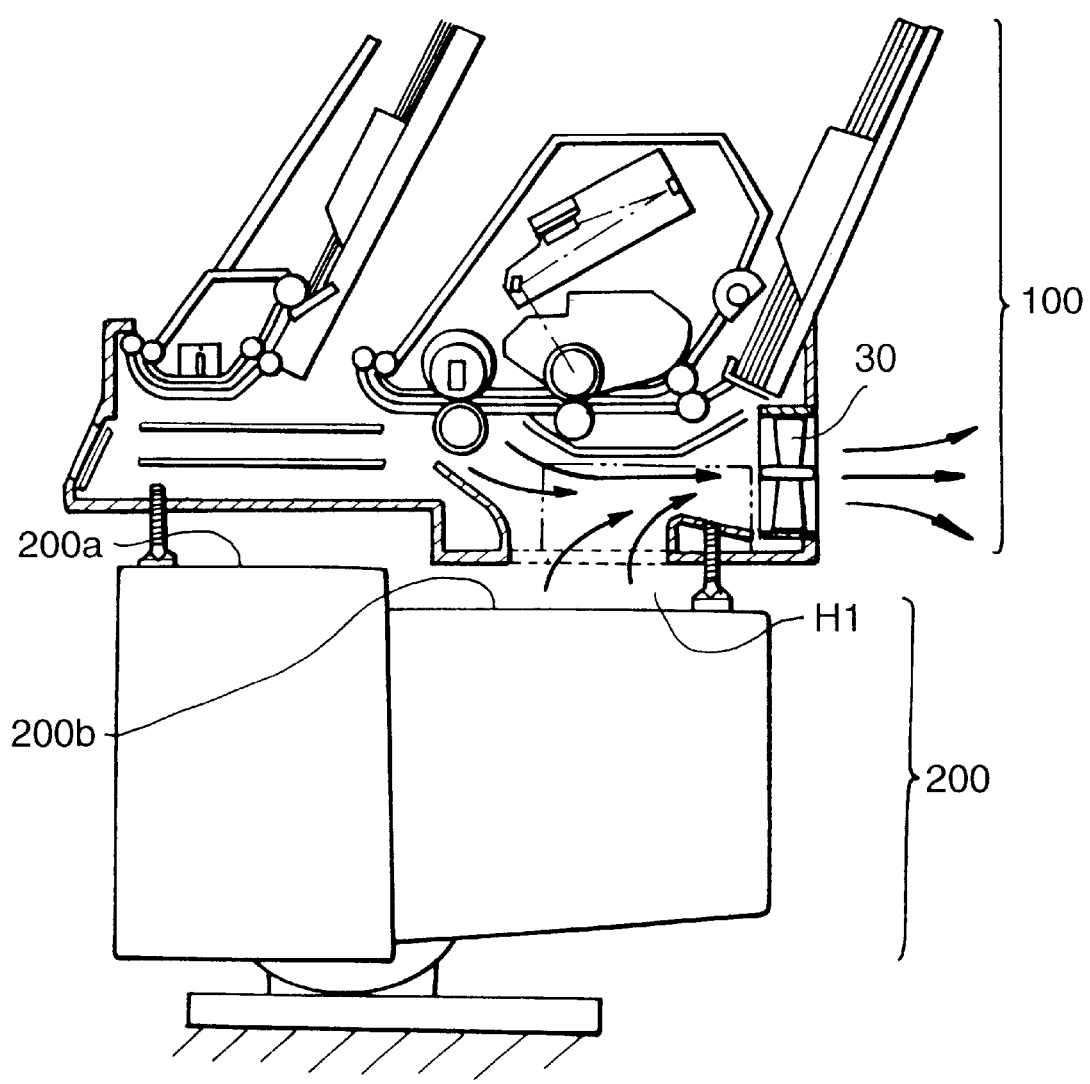
FIG. 9 is a view for explaining heat dissipation in FIG. 8.

FIGS. 8 and 9 are views for explaining operation that takes place when a multi-function apparatus 100 shown in FIG. 7 is set on a display monitor 200. FIG. 8 shows the standby state of the multi-function apparatus 100. In this state, heat in the rear portion of the display monitor 200 does not stay in a gap H1 between the display monitor 200 and multi-function apparatus 100, but is transmitted through the opening 52 to heat sheet convey guides 54 and 55 around a fixing unit 5.

In a thermal fixing type electrophotographic printing apparatus, the water content of the print sheet is evaporated by the fixing unit 5 to condense on the surrounding members. When the condensation amount increases, water sometimes drops onto a print sheet S during conveyance to cause an image defect. To prevent this, the air duct 53 of the multi-function apparatus 100 transmits heat from the display monitor 200 to a portion around the fixing unit 5 so as to heat the sheet convey guides 54 and 55. As a result, condensation is prevented.

Referring to FIG. 9, assume that heat around the fixing unit 5 becomes excessively high, or the display monitor 200 does not operate so the interior of the multi-function apparatus 100 cannot be heated. In this case, a heat dissipating blower fan 30 is operated to exhaust excessive heat and water vapor in the multi-function apparatus 100 to the outside of the apparatus 100. A temperature sensor 31 for measuring the temperature around the fixing unit 5 detects the temperature at which condensation tends to occur, and the heated state of the fixing unit, and controls the operation and stop of the blower fan 30 in the following manner.

Figure 10:
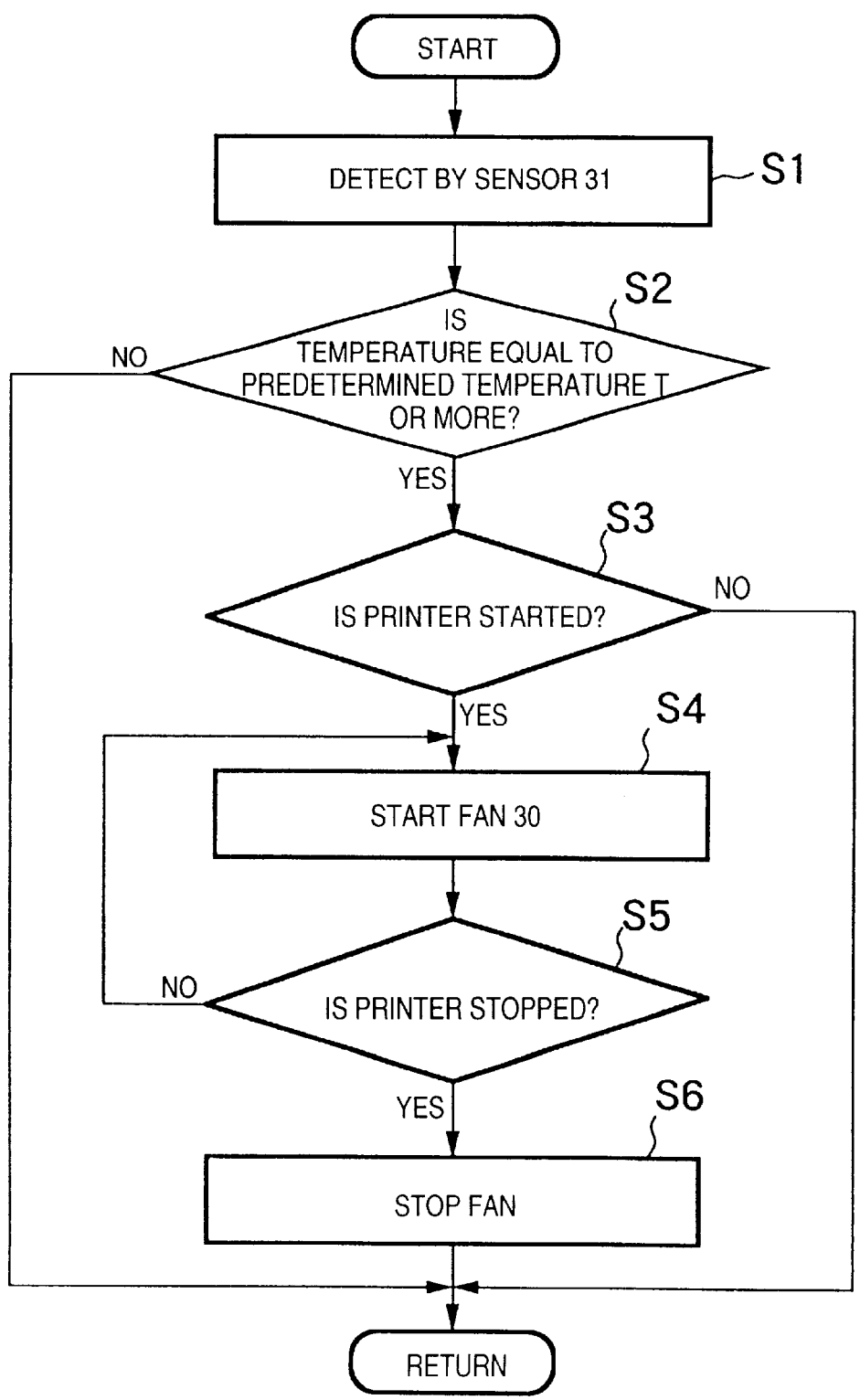
FIG. 10 is a control flow chart of a blower fan.

FIG. 10 is a flow chart of the drive control operation of the blower fan which is done on the basis of the temperature sensor result obtained by the temperature sensor 31.

Referring to FIG. 10, the temperature sensor 31 set near the fixing unit detects temperature, as described above (step S1). In step S2, it is determined whether the detected temperature is a predetermined temperature T or more. If YES in step S2, it is checked in step S3 whether the printer of the printing unit is started. If NO in step S3, the flow branches to RETURN. If it is determined in step S3 that the printer is started, the blower fan 30 is started in step S4, and power is supplied to the fan until printer stop is determined in step S5. After that, the fan is stopped in-step S6. If it is determined in step S2 that the detected temperature is less than the predetermined temperature, the flow branches to RETURN.

As described above, when the printing unit starts operation, the heat dissipation fan is stopped. When the temperature detection sensor 31 detects heat equal to a predetermined temperature or more, the heat dissipation fan is rotated. While the temperature detection sensor 31 detects heat of another predetermined temperature or less, when image printing operation is started, the blower fan is controlled to rotate from the beginning.

Figure 11:
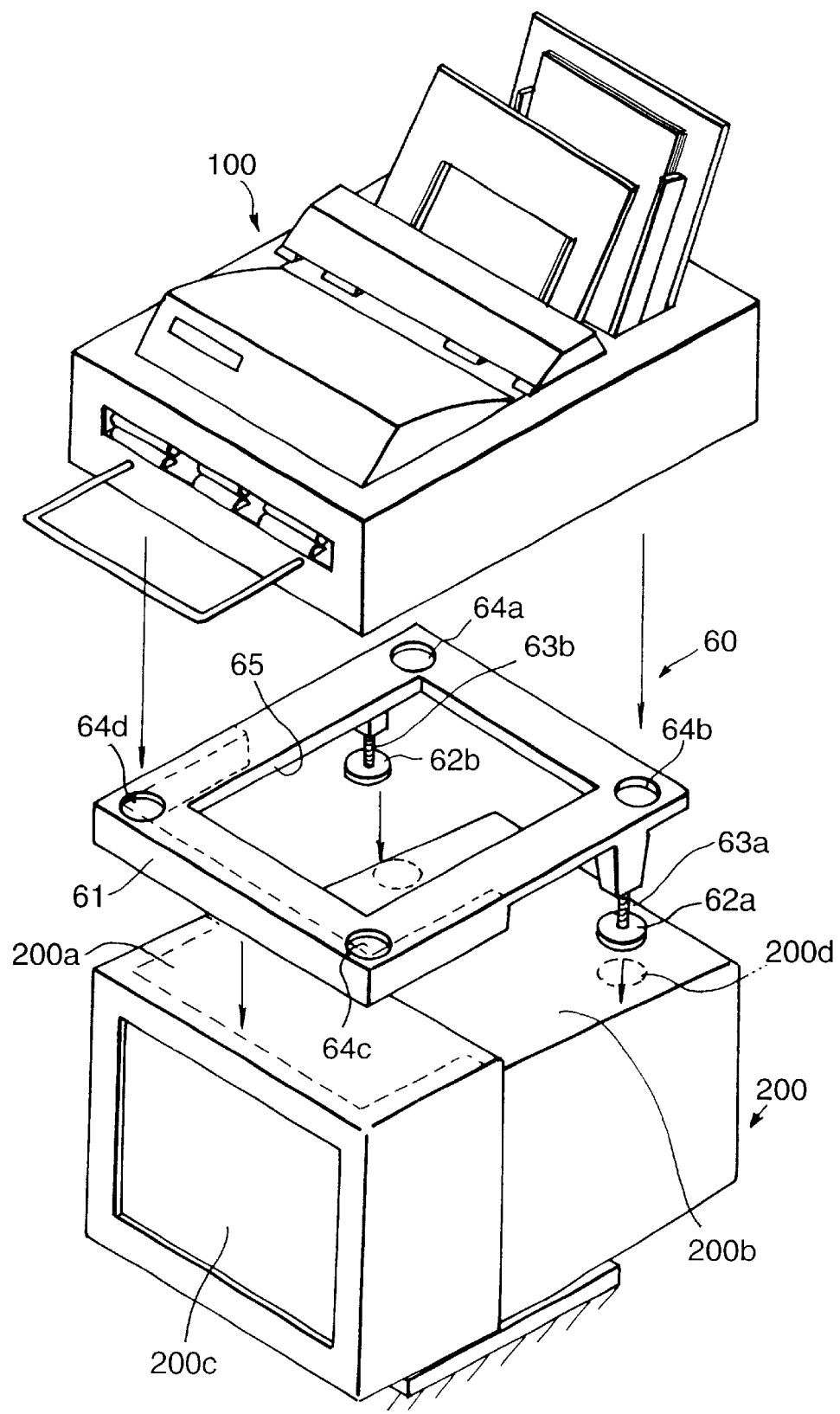
FIG. 11 is an outer appearance perspective view showing the positional relationship between a table on which the multi-function apparatus is to be set, and a monitor.

Finally, FIG. 11 is an outer appearance perspective view of a table 60 on which the multi-function apparatus 100 is to be set, and the display monitor 200.

Referring to FIG. 11, the bottom surface of the multi-function apparatus 100 has an installing portion forming a horizontal surface, so that the multi-function apparatus 100 can be stably set on a flat surface such as a desktop. As shown in FIG. 11, the table 60 is formed with a guide 61 at its lower front portion to serve as a support leg as well as an air duct regulating member. When the guide 61 is placed on the carrier surface 200a at the front portion of the display monitor 200, it is located on an installing portion 200c (indicated by a broken line). Then, the guide 61 serves as the front leg of the table 60, and also covers the front side of the display monitor 200. This prevents air exhausted from the lower surface of the multi-function apparatus 100 from flowing forward where the user operates the apparatus 100.

Support legs 62a and 62b are disposed on the two sides of the rear portion of the table 60. The heights of the support legs 62a and 62b can be adjusted by screws 63a and 63b identical to those described above. When the table 60 is placed on the display monitor 200 by adjusting the above screws, setting positions 64a to 64d, respectively formed with recesses in order to immobilize the multi-function apparatus 100, can be se horizontal.

A largely bored opening 65 is formed near the center of the table 60. Heat from the display monitor 200 and exhaust hot air from the lower surface of the multi-function apparatus 100 flow through the opening 65.

As described above, since height-adjustable support means is provided to the lower surface of the apparatus, the apparatus can be installed to float from the installing place. Hence, heat generated in the lower portion of the apparatus can be dissipated. When the image printing apparatus is set on a display monitor or the like which generates heat, the blower fan dissipates heat in the image reader, and also prevents heat of the display monitor from being trapped between the display monitor and the image reader. The support means of the apparatus can be adjusted to different heights. Even when the image reader is set on a display monitor having different heights at the front and rear portions, it can be maintained horizontal, and heat dissipation from the apparatus main body and the heat dissipation process of heat in the image reader can be performed. Even if heat stays entrapped between the image reader and the display monitor under it, hot air does not flow to the user. Since the support members also serve as the ventilation regulating members, the apparatus cost can be reduced. When the image reader is set on the display monitor, heat in the image reader and heat in the display monitor can both be exhausted. While the image reader is set on the display monitor, when the temperature is set at a value at which the sheet convey path tends to cause condensation, the operation of the heat dissipation fan is prohibited, and heat generated by the display monitor is guided to the fixing portion in the electrophotographic image reader, so that the sheet convey path near the fixing unit can be heated. As a result, the sheet convey path is prevented from causing condensation due to water vapor produced from the sheet during image fixing. The block wall at the front portion of the table set on the display monitor prevents heat from the display monitor from flowing to the user. Simultaneously, since heat radiated from the upper portion of the display monitor is relieved from the ventilation hole in the carrier plate, excessive heat generation of the display monitor can be suppressed. When the carrier plate is set on the display monitor and the image printing means is set on the carrier plate, heat of the display monitor and heat of the image reader can both be dissipated by the heat dissipation fan of the image printing means.

As has been described above, the present invention can provide an image printing apparatus and a table therefor, which can make a flat installation surface unnecessary and which are not influenced by external and internal heat sources.

Additionally, the present invention can also provide an image printing apparatus and a table therefor, which do not make the user feel uncomfortable during use.

As many apparently widely different embodiments of the present invention can be made without departing from the spirit and scope thereof, it is to be understood that the invention is not limited to the specific embodiments thereof except as defined in the appended claims.

What is claimed is:

1. An image printing apparatus for use with an other apparatus having an installation surface including different portions having different heights, said image printing apparatus comprising:
    a body including a lower surface portion having different portions with different heights; and
    a plurality of support means, each having height adjusting portions, for supporting said image printing apparatus with a substantially horizontal orientation on the installation surface of the other apparatus, and for defining a gap between said lower surface portion of said body and the installation surface of the other apparatus, for exchanging air and heat.

2. The image printing apparatus according to claim 1, wherein said lower surface portion contains cooling means, including a blower fan, for blowing air into the gap.

3. The image printing apparatus according to claim 1, wherein the other apparatus is a display apparatus, and the installation surface is an upper surface of the display unit having different heights in a back-and-front direction, and said plurality of support means allows separate adjustment for said height adjusting portions disposed in the back-and-front direction.

4. The image printing apparatus according to claim 1, wherein at least a portion of the installation surface is inclined, and each of said plurality of support means is formed of a countersunk member displaceably, axially supported by a ball bearing to provide a support on the inclined installation surface, a shaft member having said ball bearing at an end portion thereof, and a screw portion threadably engaged in a screw hole formed in said lower surface portion.

5. An image printing apparatus for use with a display apparatus having an installation surface including different-height steps in a back-and-front direction, said image printing apparatus comprising:
    a body including a lower surface portion having different portions with different heights;
    front and rear support means having a height adjusting function for supporting said image printing apparatus with a substantially horizontal orientation on the installation surface of the display apparatus, and for defining a gap between the lower surface portion of the body and the installation surface of the other apparatus;
    a blower fan that blows air into the gap through an opening in said lower surface portion; and
    a ventilation regulating member, disposed in the gap near a front side of the display apparatus, that regulates flow of air from said blower fan.

6. The image printing apparatus according to claim 5, wherein said front and rear support means comprises a front support member, and said front support member and said ventilation regulating member are integrally formed at said lower surface portion.

7. The image printing apparatus according to claim 5, wherein said lower surface portion forms front and rear steps corresponding to the installation surface of the display apparatus.

8. An image printing apparatus for use with a display apparatus having an installation surface including different-height steps in a back-and-front direction, said image printing apparatus comprising:
    a body including a lower surface portion having different portions with different heights;
    front and rear support means, each having a height adjusting function, for supporting said image printing apparatus with a substantially horizontal orientation on the installation surface of the display apparatus, and for defining a gap between said lower surface portion of said body and the installation surface of the display apparatus;
    a duct defining an opening in said lower surface portion;
    image printing means providing an internal heat source; and
    a blower fan disposed at a portion of said image printing apparatus other than a front portion,
    wherein the opening in said lower surface portion, said duct, said image printing means and said blower fan are in fluid communication with each other, and
    wherein heat from an external heat source including the display apparatus is guided into said duct through the opening in said lower surface portion, and is exhausted to the exterior of said image printing apparatus by said blower fan.

9. The image printing apparatus according to claim 5, wherein at least a portion of the installation surface is inclined, and each of said front and rear support means is formed of a countersunk member displaceably, axially supported by a ball bearing to provide a support on the inclined installation surface, a shaft member having said ball bearing at an end portion thereof, and a screw portion threadably meshed with a screw hole formed in said lower surface portion.

10. The image printing apparatus according to claim 9, further comprising:
    temperature detection means, disposed near said image printing means, for detecting a temperature of said image printing means; and
    control means for performing control operation on the basis of a detected temperature from said temperature detection means, such that a heat dissipation fan is kept stopped at a start of operation of said image printing means and is rotated when said temperature detection means detects a temperature not less than a predetermined temperature, and that said blower fan is rotated from a time when an image printing operation is started until said temperature detection means detects a temperature not more than another predetermined temperature.

11. A table for supporting an image printing apparatus in a substantially horizontally orientation on an installation surface of a display apparatus having steps with different heights in a back-and-front direction, said table comprising:
- a base portion comprising front and rear support means, each having height adjusting portions, for defining a gap between a lower surface portion of the image printing apparatus and the installation surface of the display apparatus; and
- a ventilation regulating member, disposed in the gap near a front side of the display apparatus, that regulates a flow of air between said lower surface portion and the installation surface at the front side of the display apparatus.

12. The table according to claim 11, wherein said base portion is formed with an opening providing a flow path between the image printing apparatus and the installation surface of the display apparatus.

13. The table according to claim 11, wherein at least a portion of the installation surface is inclined, and each of said front and rear support means is formed of a countersunk member displaceably, axially supported by a ball bearing to provide a support on the installation surface, a shaft member having said ball bearing at an end portion thereof, and a screw portion threadably meshed with a screw hole formed in said lower surface portion.

* * * * *

UNITED STATES PATENT AND TRADEMARK OFFICE
CERTIFICATE OF CORRECTION

PATENT NO. : 6,473,152 B1
DATED : October 29, 2002
INVENTOR(S) : Masahiko Yokota It is certified that error appears in the above-identified patent and that said Letters Patent is hereby corrected as shown below:

<u>Title page,</u>
Item [57], ABSTRACT,
Line 4, "enchanged" should read -- exchange --.

<u>Column 1,</u>
Line 54, "a" (second occurrence) should read -- an --.

<u>Column 2,</u>
Line 44, "THE-" should read -- THE --.

<u>Column 3,</u>
Line 59, "lone" should read -- long --.

<u>Column 4,</u>
Line 42, "a-place" should read -- a place --.

<u>Column 5,</u>
Line 67, "in-step" should read -- in step --.

<u>Column 6,</u>
Line 36, "se" should read -- set --.

<u>Column 8,</u>
Line 57, "claim 9," should read -- claim 8, --.

<u>Column 9,</u>
Line 8, "horizontally" should read -- horizontal --.

Signed and Sealed this

Twelfth Day of August, 2003

JAMES E. ROGAN
*Director of the United States Patent and Trademark Office*